(12) United States Patent
Bang et al.

(10) Patent No.: US 12,683,764 B2
(45) Date of Patent: Jul. 14, 2026

(54) DATA PROCESSING DEVICE FOR RAILED VEHICLE CONTROL

(71) Applicant: UNIONPLACE CO., LTD., Seoul (KR)

(72) Inventors: Seongcheol Bang, Seoul (KR); Hyojung Kim, Seoul (KR); Youngkyu Shin, Seoul (KR); Seunggyeom Kim, Seoul (KR)

(73) Assignee: UNIONPLACE CO., LTD., Seoul (KR)

( * ) Notice: Subject to any disclaimer, the term of this patent is extended or adjusted under 35 U.S.C. 154(b) by 267 days.

(21) Appl. No.: 18/470,249

(22) Filed: Sep. 19, 2023

(65) Prior Publication Data

US 2024/0187216 A1 Jun. 6, 2024

(30) Foreign Application Priority Data

Dec. 5, 2022 (KR) ........................ 10-2022-0167379

(51) Int. Cl.
    *H04L 9/06*     (2006.01)
    *H04L 9/00*     (2022.01)
    *H04L 9/08*     (2006.01)

(52) U.S. Cl.
    CPC .......... *H04L 9/0643* (2013.01); *H04L 9/0822* (2013.01); *H04L 9/50* (2022.05)

(58) Field of Classification Search
    CPC ....... H04L 9/0643; H04L 9/0822; H04L 9/50; H04L 2209/84; H04L 9/3239; H04L 9/3242
    See application file for complete search history.

(56) References Cited

U.S. PATENT DOCUMENTS

2005/0205719 A1* 9/2005 Hendrickson ....... B61L 15/0081
                      246/122 R
2007/0146159 A1* 6/2007 Kato ..................... B61L 25/025
                      340/8.1

(Continued)

FOREIGN PATENT DOCUMENTS

JP       2020-027622 A    2/2020
KR   10-2010-0067459 A   6/2010

(Continued)

OTHER PUBLICATIONS

Korean Office Action mailed Feb. 14, 2023, issued to corresponding Korean Application No. 10-2022-0167379.

*Primary Examiner* — Blake I Narramore
(74) *Attorney, Agent, or Firm* — Stein IP, LLC

(57) ABSTRACT

There is provided a data processing device disposed in a carriage of a railed vehicle. The data processing device includes an operation processor. The operation processor (a) generates an initial authentication value for carriage by computing unique identification information of electronic devices disposed in the carriage by using a hash algorithm, (b) transmits an encryption key and a hash key to the electronic devices; (c) receive, from an i-th electronic device, i-th state data including i-th state information and an i-th device authentication value, and authenticate the i-th state data where "i" is an integer from 1 to n; (d) generates carriage data using state data authenticated in (c); and (e) generates a carriage authentication value based on device identification information obtained from the state data, and authenticates the carriage data by comparing the carriage authentication value with the initial authentication value for carriage.

20 Claims, 7 Drawing Sheets

(56)        References Cited

U.S. PATENT DOCUMENTS

| | | | | |
|---|---|---|---|---|
| 2021/0028942 A1* | 1/2021 | Dover | ................. | G06F 12/1408 |
| 2021/0075620 A1* | 3/2021 | Driscoll | ............. | H04L 63/1466 |
| 2021/0336797 A1* | 10/2021 | Van Duren | .......... | H04L 9/3297 |
| 2023/0155836 A1* | 5/2023 | Burnett | ................. | H04L 9/3268 |
| | | | | 726/19 |
| 2023/0198784 A1* | 6/2023 | Miller | ................. | H04L 63/0869 |
| | | | | 713/151 |
| 2023/0246849 A1* | 8/2023 | Unagami | ................ | H04L 9/085 |
| | | | | 713/176 |
| 2023/0396447 A1* | 12/2023 | Junk | ..................... | H04L 9/3247 |
| 2024/0121102 A1* | 4/2024 | Friesen | ................. | H04L 9/0656 |

FOREIGN PATENT DOCUMENTS

| | | |
|---|---|---|
| KR | 10-2011-0023817 A | 3/2011 |
| KR | 10-1730874 B1 | 4/2017 |
| KR | 10-1740957 B1 | 5/2017 |
| KR | 10-2008670 B1 | 8/2019 |
| KR | 10-2059192 B1 | 2/2020 |
| KR | 10-2334443 B1 | 12/2021 |
| KR | 10-2349606 B1 | 1/2022 |
| KR | 10-2409693 B1 | 6/2022 |
| KR | 10-2437864 B1 | 8/2022 |
| KR | 10-2524379 B1 | 4/2023 |

* cited by examiner

FIG. 1

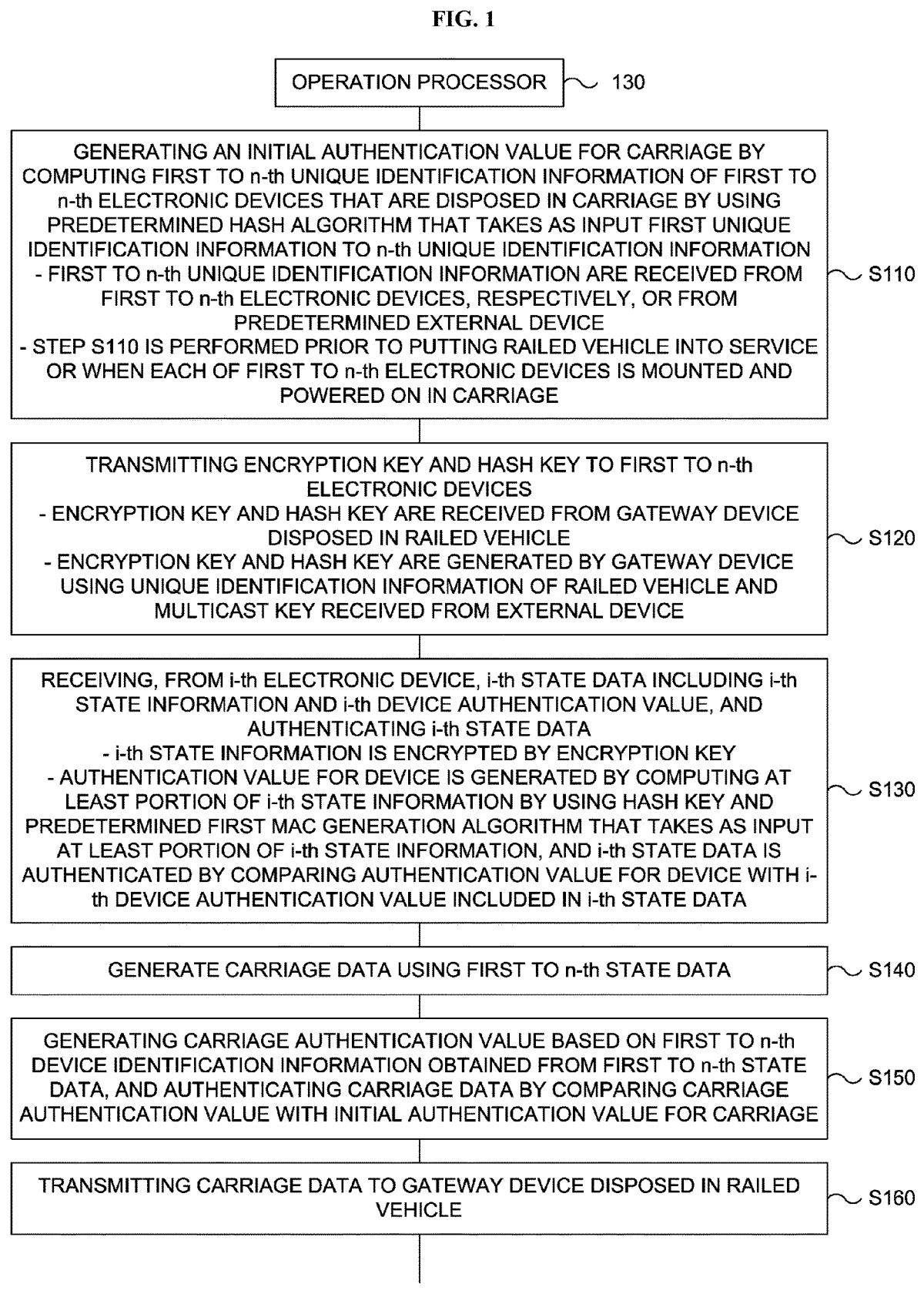

OPERATION PROCESSOR — 130

GENERATING AN INITIAL AUTHENTICATION VALUE FOR CARRIAGE BY COMPUTING FIRST TO n-th UNIQUE IDENTIFICATION INFORMATION OF FIRST TO n-th ELECTRONIC DEVICES THAT ARE DISPOSED IN CARRIAGE BY USING PREDETERMINED HASH ALGORITHM THAT TAKES AS INPUT FIRST UNIQUE IDENTIFICATION INFORMATION TO n-th UNIQUE IDENTIFICATION INFORMATION
- FIRST TO n-th UNIQUE IDENTIFICATION INFORMATION ARE RECEIVED FROM FIRST TO n-th ELECTRONIC DEVICES, RESPECTIVELY, OR FROM PREDETERMINED EXTERNAL DEVICE
- STEP S110 IS PERFORMED PRIOR TO PUTTING RAILED VEHICLE INTO SERVICE OR WHEN EACH OF FIRST TO n-th ELECTRONIC DEVICES IS MOUNTED AND POWERED ON IN CARRIAGE — S110

TRANSMITTING ENCRYPTION KEY AND HASH KEY TO FIRST TO n-th ELECTRONIC DEVICES
- ENCRYPTION KEY AND HASH KEY ARE RECEIVED FROM GATEWAY DEVICE DISPOSED IN RAILED VEHICLE
- ENCRYPTION KEY AND HASH KEY ARE GENERATED BY GATEWAY DEVICE USING UNIQUE IDENTIFICATION INFORMATION OF RAILED VEHICLE AND MULTICAST KEY RECEIVED FROM EXTERNAL DEVICE — S120

RECEIVING, FROM i-th ELECTRONIC DEVICE, i-th STATE DATA INCLUDING i-th STATE INFORMATION AND i-th DEVICE AUTHENTICATION VALUE, AND AUTHENTICATING i-th STATE DATA
- i-th STATE INFORMATION IS ENCRYPTED BY ENCRYPTION KEY
- AUTHENTICATION VALUE FOR DEVICE IS GENERATED BY COMPUTING AT LEAST PORTION OF i-th STATE INFORMATION BY USING HASH KEY AND PREDETERMINED FIRST MAC GENERATION ALGORITHM THAT TAKES AS INPUT AT LEAST PORTION OF i-th STATE INFORMATION, AND i-th STATE DATA IS AUTHENTICATED BY COMPARING AUTHENTICATION VALUE FOR DEVICE WITH i-th DEVICE AUTHENTICATION VALUE INCLUDED IN i-th STATE DATA — S130

GENERATE CARRIAGE DATA USING FIRST TO n-th STATE DATA — S140

GENERATING CARRIAGE AUTHENTICATION VALUE BASED ON FIRST TO n-th DEVICE IDENTIFICATION INFORMATION OBTAINED FROM FIRST TO n-th STATE DATA, AND AUTHENTICATING CARRIAGE DATA BY COMPARING CARRIAGE AUTHENTICATION VALUE WITH INITIAL AUTHENTICATION VALUE FOR CARRIAGE — S150

TRANSMITTING CARRIAGE DATA TO GATEWAY DEVICE DISPOSED IN RAILED VEHICLE — S160

FIG. 5

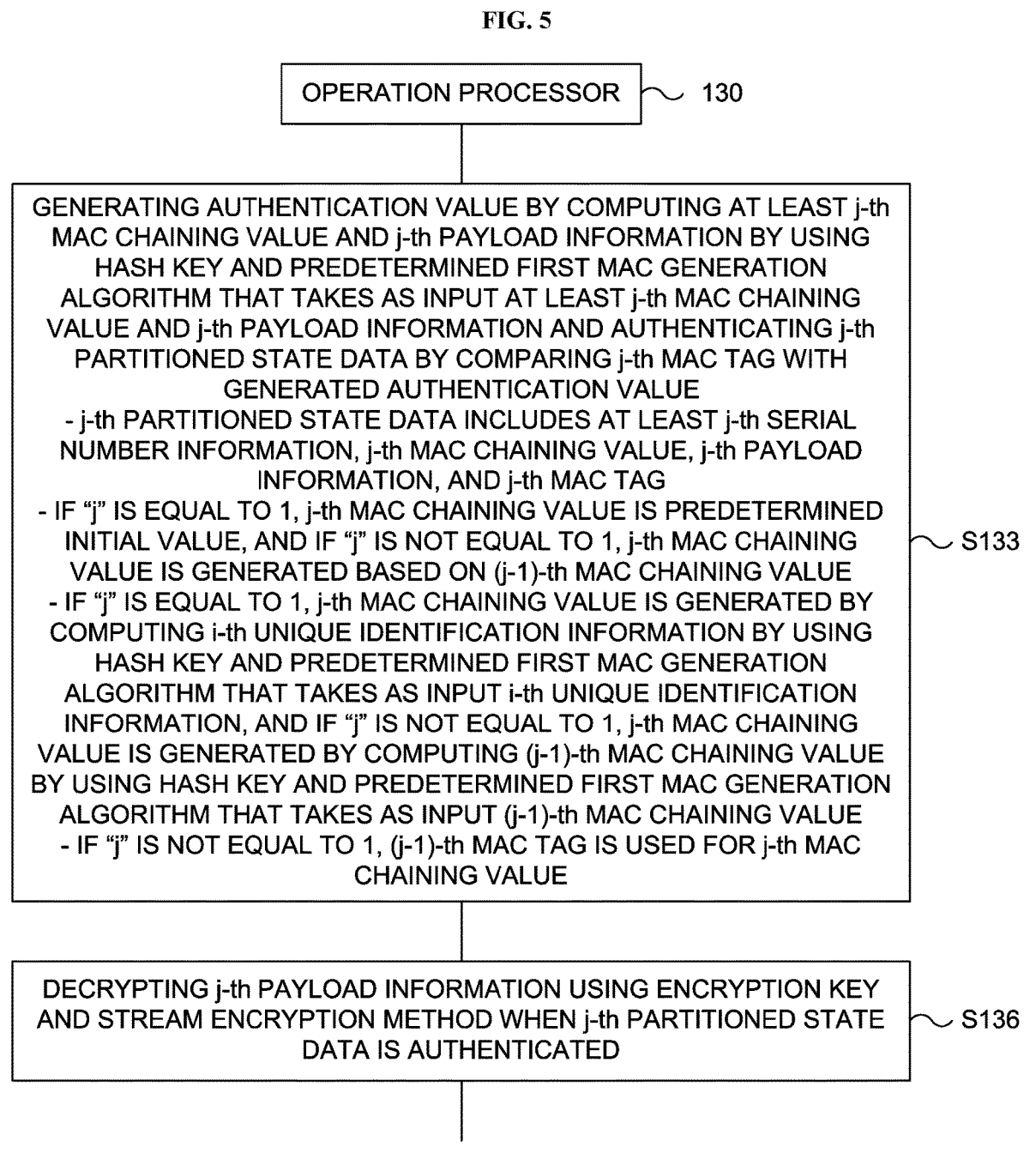

OPERATION PROCESSOR ~ 130

GENERATING AUTHENTICATION VALUE BY COMPUTING AT LEAST j-th MAC CHAINING VALUE AND j-th PAYLOAD INFORMATION BY USING HASH KEY AND PREDETERMINED FIRST MAC GENERATION ALGORITHM THAT TAKES AS INPUT AT LEAST j-th MAC CHAINING VALUE AND j-th PAYLOAD INFORMATION AND AUTHENTICATING j-th PARTITIONED STATE DATA BY COMPARING j-th MAC TAG WITH GENERATED AUTHENTICATION VALUE
- j-th PARTITIONED STATE DATA INCLUDES AT LEAST j-th SERIAL NUMBER INFORMATION, j-th MAC CHAINING VALUE, j-th PAYLOAD INFORMATION, AND j-th MAC TAG
- IF "j" IS EQUAL TO 1, j-th MAC CHAINING VALUE IS PREDETERMINED INITIAL VALUE, AND IF "j" IS NOT EQUAL TO 1, j-th MAC CHAINING VALUE IS GENERATED BASED ON (j-1)-th MAC CHAINING VALUE
- IF "j" IS EQUAL TO 1, j-th MAC CHAINING VALUE IS GENERATED BY COMPUTING i-th UNIQUE IDENTIFICATION INFORMATION BY USING HASH KEY AND PREDETERMINED FIRST MAC GENERATION ALGORITHM THAT TAKES AS INPUT i-th UNIQUE IDENTIFICATION INFORMATION, AND IF "j" IS NOT EQUAL TO 1, j-th MAC CHAINING VALUE IS GENERATED BY COMPUTING (j-1)-th MAC CHAINING VALUE BY USING HASH KEY AND PREDETERMINED FIRST MAC GENERATION ALGORITHM THAT TAKES AS INPUT (j-1)-th MAC CHAINING VALUE
- IF "j" IS NOT EQUAL TO 1, (j-1)-th MAC TAG IS USED FOR j-th MAC CHAINING VALUE

~ S133

DECRYPTING j-th PAYLOAD INFORMATION USING ENCRYPTION KEY AND STREAM ENCRYPTION METHOD WHEN j-th PARTITIONED STATE DATA IS AUTHENTICATED

Figure 7:
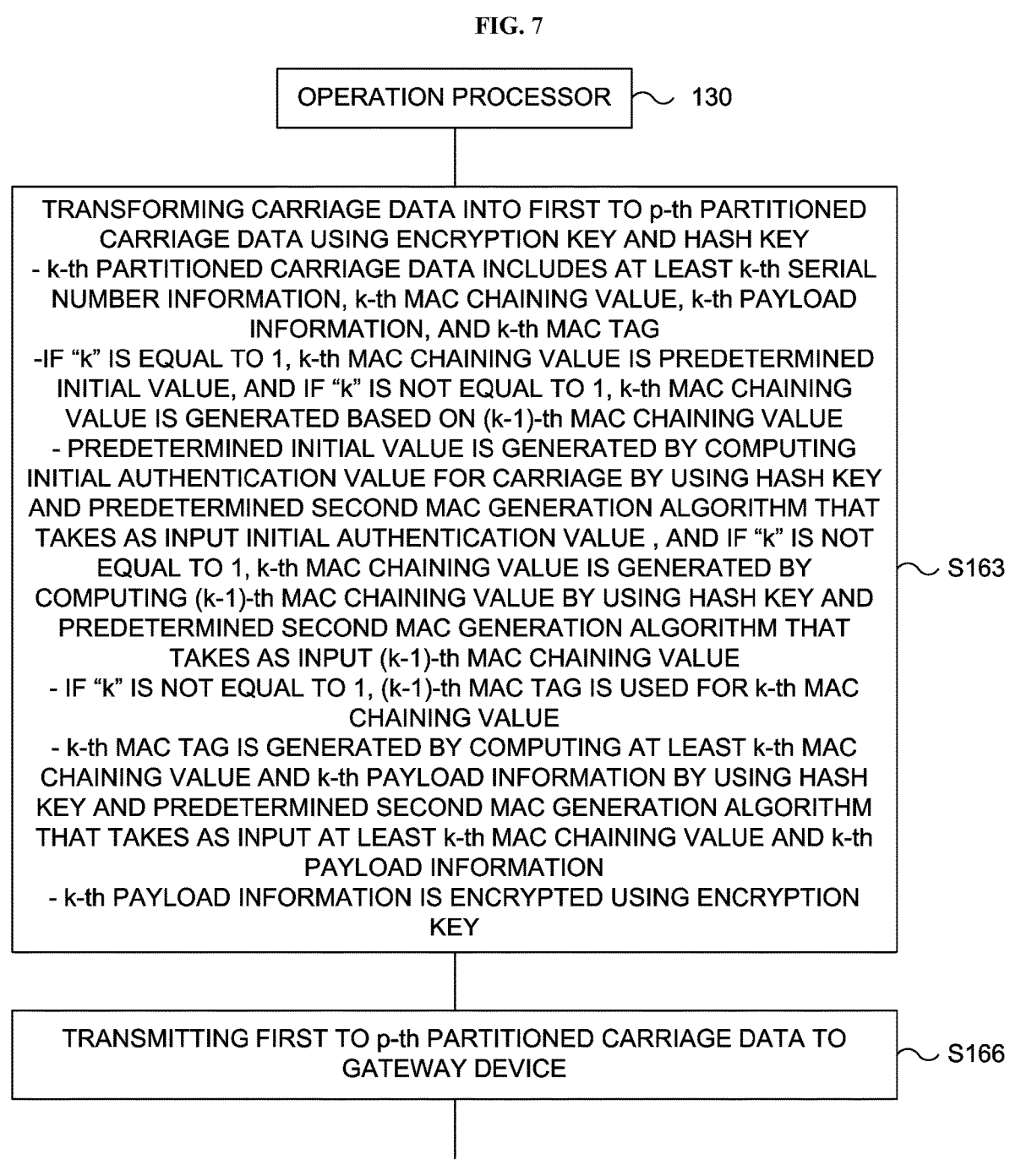

OPERATION PROCESSOR ── 130

TRANSFORMING CARRIAGE DATA INTO FIRST TO p-th PARTITIONED CARRIAGE DATA USING ENCRYPTION KEY AND HASH KEY
- k-th PARTITIONED CARRIAGE DATA INCLUDES AT LEAST k-th SERIAL NUMBER INFORMATION, k-th MAC CHAINING VALUE, k-th PAYLOAD INFORMATION, AND k-th MAC TAG
-IF "k" IS EQUAL TO 1, k-th MAC CHAINING VALUE IS PREDETERMINED INITIAL VALUE, AND IF "k" IS NOT EQUAL TO 1, k-th MAC CHAINING VALUE IS GENERATED BASED ON (k-1)-th MAC CHAINING VALUE
- PREDETERMINED INITIAL VALUE IS GENERATED BY COMPUTING INITIAL AUTHENTICATION VALUE FOR CARRIAGE BY USING HASH KEY AND PREDETERMINED SECOND MAC GENERATION ALGORITHM THAT TAKES AS INPUT INITIAL AUTHENTICATION VALUE , AND IF "k" IS NOT EQUAL TO 1, k-th MAC CHAINING VALUE IS GENERATED BY COMPUTING (k-1)-th MAC CHAINING VALUE BY USING HASH KEY AND PREDETERMINED SECOND MAC GENERATION ALGORITHM THAT TAKES AS INPUT (k-1)-th MAC CHAINING VALUE
- IF "k" IS NOT EQUAL TO 1, (k-1)-th MAC TAG IS USED FOR k-th MAC CHAINING VALUE
- k-th MAC TAG IS GENERATED BY COMPUTING AT LEAST k-th MAC CHAINING VALUE AND k-th PAYLOAD INFORMATION BY USING HASH KEY AND PREDETERMINED SECOND MAC GENERATION ALGORITHM THAT TAKES AS INPUT AT LEAST k-th MAC CHAINING VALUE AND k-th PAYLOAD INFORMATION
- k-th PAYLOAD INFORMATION IS ENCRYPTED USING ENCRYPTION KEY

── S163

TRANSMITTING FIRST TO p-th PARTITIONED CARRIAGE DATA TO GATEWAY DEVICE

── S166

DATA PROCESSING DEVICE FOR RAILED VEHICLE CONTROL

CROSS-REFERENCE TO RELATED PATENT APPLICATION

This non-provisional U.S. patent application is based on and claims priority under 35 U.S.C. § 119 of Korean Patent Application No. 10-2022-0167379, filed on Dec. 5, 2022, in the Korean Intellectual Property Office, the entire contents of which are hereby incorporated by reference.

BACKGROUND

1. Field

The present disclosure relates to a data processing device for controlling a railed vehicle, and more particularly, to a data processing device disposed in each carriage of the railed vehicle.

The technique disclosed herein was supported by Institute for Information & communications Technology Promotion (IITP) grant funded by the Korea government (Ministry of Science and ICT (MSIT)) (Project name: "LTE-R 5G Integrated-control Container on Next Generation Railway Communication," Project No.: 2021-0-00477-003, NIST No.: 1711193984(2023)).

2. Related Art

Railed vehicles such as trains are equipped with multiple carriages. Each of the multiple carriages may contain various electronic devices.

For example, within each carriage, there can be various electronic devices such as fire detection sensors, speed sensors, air conditioners, heaters, temperature sensors, braking systems, intercoms, door opening and closing mechanisms, door open/close detection sensors, emergency handle detection sensors, reversing gear sensors, and media playback devices.

The railed vehicle may generate railed vehicle data by receiving state data generated by a plurality of electronic devices disposed in the railed vehicle (e.g., electronic devices disposed in the carriage), and further transmit the generated railed vehicle data to an external device (e.g., a server operated by an entity such as a control center for control of the railed vehicle). For comprehensive management of the railed vehicle, the railed vehicle may generate and manage the railed vehicle data, and further transmit the railed vehicle data to the external device.

The railed vehicle data may include information generated by, for example, a train control and monitoring system (TCMS) protocol. The TCMS specification is a management standard developed by Hyundai Rotem and is currently applied to the operation of subways and railroads in South Korea.

An example of communicating railed vehicle data between a train that is an example of the railed vehicle and an external device will be described in more detail.

First, a data processing device disposed in the train receives state data from a plurality of electronic devices. The data processing device may be arranged, for example, in a locomotive of the train. For example, when the locomotives are respectively arranged at the front portion and the rear of the train (i.e., two locomotives in the train), two data processing devices may be disposed in the train.

The state data may include information generated by, for example, the TCMS protocol.

Then, the data processing device generates railed vehicle data according to the TCMS protocol based on the state data, and transmits the generated railed vehicle data to the external device using a wireless communication protocol. The external device may transmit data to the data processing device using the wireless communication protocol.

When an electronic device transmits state data to the data processing device and the data processing device receives the state data from the electronic device, and when the data processing device transmits railed vehicle data to the external device and the external device receives the railed vehicle data, the state data and the railed vehicle data may be tampered with by malicious users, such as hackers. In addition, unauthorized electronic devices may be arbitrarily installed in the train, which may result in the generation of anomalous state data and anomalous railed vehicle data. If tampered state data or tampered railed vehicle data is used, or if unauthorized electronic devices are arbitrarily installed, the train cannot operate normally and a traffic accident may occur.

To improve these shortcomings, state data encrypted using an encryption key can be transmitted and received between the plurality of electronic devices and the data processing device, and railed vehicle data encrypted using an encryption key can be transmitted and received between the data processing device and the external device.

First, it is assumed that the data processing device and the electronic device share an encryption key. The electronic device encrypts the state data using the encryption key and transmits the encrypted state data to the data processing device using a wired or wireless communication protocol. The data processing device receives the encrypted state data from the electronic device using the wired or wireless communication protocol and decrypts the encrypted state data using the shared encryption key. The, the decrypted status data is interpreted.

The method using the above-described encryption key may have a high encryption level through block cipher. However, since high computing power (high computing capabilities) is required for the block cipher, the downside is that the electronic device and the data processing device have to be implemented using semiconductor devices such as a central processing unit (CPU), a micro control unit (MCU), and an application specific integrated circuit (ASIC) with high computing power.

Further, it is assumed that the data processing device and the external device share an encryption key. The data processing device encrypts the railed vehicle data using the encryption key and transmits the encrypted railed vehicle data to the external device using a wireless communication protocol. The external device receives the encrypted railed vehicle data from the data processing device using the wireless communication protocol and decrypts the encrypted railed vehicle data using the shared encryption key. Then, the decrypted railed vehicle data is interpreted.

The method using the above-described encryption key may have a high encryption level through block cipher. However, since high computing power (high computing capabilities) is required for the block cipher, The downside is that the data processing device has to be implemented using semiconductor devices such as a central processing unit (CPU), a micro control unit (MCU), and an application specific integrated circuit (ASIC) with high computing power.

In addition, when the block cipher is used as described above, it is difficult to transmit the railed vehicle data to the external device in real time, particularly in the train moving at high speed. For example, due to the nature of the train, the railed vehicle data must be generated and transmitted to the external device within a predetermined time based on an emergency braking distance. However, because of the computational (operation) load when using the block cipher, it is difficult to quickly generate and transmit the railed vehicle data in real-time or quasi-real time.

Further, the train includes a plurality of carriages, and the plurality of electronic devices are disposed in each carriage. Therefore, if one data processing device is disposed in the train, the data processing device receives and decodes state data from the plurality of the electronic devices disposed in the plurality of carriages, respectively. In that case, the processing load of the data processing device increases.

RELATED ART

Patent Document

Patent Document 1: Korean Registered Patent No. 10-2059192
Patent Document 2: Korean Registered Patent No. 10-2349606
Patent Document 3: Korean Registered Patent No. 10-2409693

SUMMARY

It is an object of the technique of the present disclosure to provide a data processing device that is capable of verifying and ensuring the integrity of vehicle data while transmitting and receiving the vehicle data; communicating the vehicle data in real time by encrypting or decrypting the vehicle data to an appropriate level in real time or quasi-real time even when the data processing device is equipped with semiconductor devices having low computing power (computing capabilities); and reducing the processing load since the data processing device is disposed in each carriage and receives state data from the plurality of electronic devices disposed in each carriage.

In view of the above, according to one aspect of the technique of the present disclosure, there is provided a data processing device disposed in a carriage of a railed vehicle, the data processing device including: an operation processor configured to perform: (a) generating an initial authentication value for carriage by computing first unique identification information to n-th unique identification information of a first electronic device to an n-th electronic device that are disposed in the carriage by using a predetermined hash algorithm that takes as input the first unique identification information to the n-th unique identification information, wherein "n" is an integer equal to or greater than 2; (b) transmitting an encryption key and a hash key to the first electronic device to the n-th electronic device; (c) receiving, from an i-th electronic device among the first electronic device to the n-th electronic device, i-th state data including i-th state information and an i-th device authentication value, and authenticate the i-th state data, wherein "i" is an integer from 1 to n; (d) generating carriage data using first state data to n-th state data authenticated in (c); and (e) generating a carriage authentication value based on first device identification information to n-th device identification information obtained from the first state data to the n-th state data, and authenticating the carriage data by comparing the carriage authentication value with the initial authentication value for carriage, wherein the i-th state information is encrypted by the encryption key and, (c) includes (c-1) generating an authentication value for device by computing at least a portion of the i-th state information by using the hash key and a predetermined first message authentication code (MAC) generation algorithm that takes as input at least the portion of the i-th state information, and authenticating the i-th state data by comparing the generated authentication value for device with the i-th device authentication value included in the i-th state data.

According to the technique of the present disclosure, it is possible to provide the data processing device that is capable of verifying and ensuring the integrity of vehicle data while transmitting and receiving the vehicle data; communicating the vehicle data in real time by encrypting or decrypting the vehicle data to an appropriate level in real time or quasi-real time even when the data processing device is equipped with semiconductor devices having low computing power (computing capabilities); and reducing the processing load since the data processing device is disposed in each carriage and receives state data from the plurality of electronic devices disposed in each carriage.

BRIEF DESCRIPTION OF THE DRAWINGS

FIG. 1 is a diagram illustrating an example of the sequence of operations performed by an operation processor of a data processing device for railed vehicle control according to a first embodiment of the technique of the present disclosure.

FIG. 5 is a diagram illustrating an example of the sequence of operations performed by an operation processor of a data processing device for railed vehicle control according to a second embodiment of the technique of the present disclosure.

FIG. 7 is a diagram illustrating an example of the sequence of operations performed by an operation processor of a data processing device for railed vehicle control according to a third embodiment of the technique of the present disclosure.

DETAILED DESCRIPTION

Figures 2, 3:
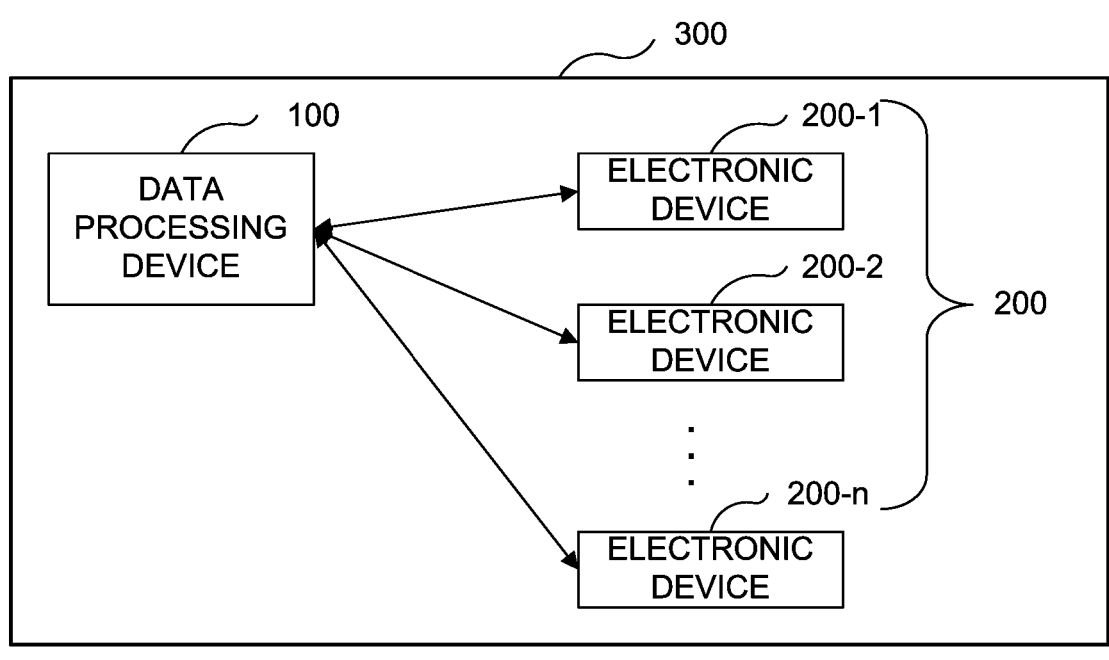
FIG. 2 is a diagram illustrating a schematic configuration of the data processing device according to the first embodiment of the technique of the present disclosure.
FIG. 3 is a diagram illustrating an example of a state in which a plurality of electronic devices and the data processing device according to the first embodiment are disposed in a carriage.

Hereinafter, one or more embodiments (also simply referred to as "embodiments") of a data processing device for railed vehicle control according to the technique of the present disclosure will be described mainly with reference to the drawings. Meanwhile, in the drawings for describing the embodiments of the technique of the present disclosure, for the sake of convenience of description, only a part of the practical configurations may be illustrated or the practical configurations may be illustrated while a part of the practical configurations is omitted or changed. Further, relative dimensions and proportions of parts therein may be exaggerated or reduced in size.

First Embodiment

Figure 4:
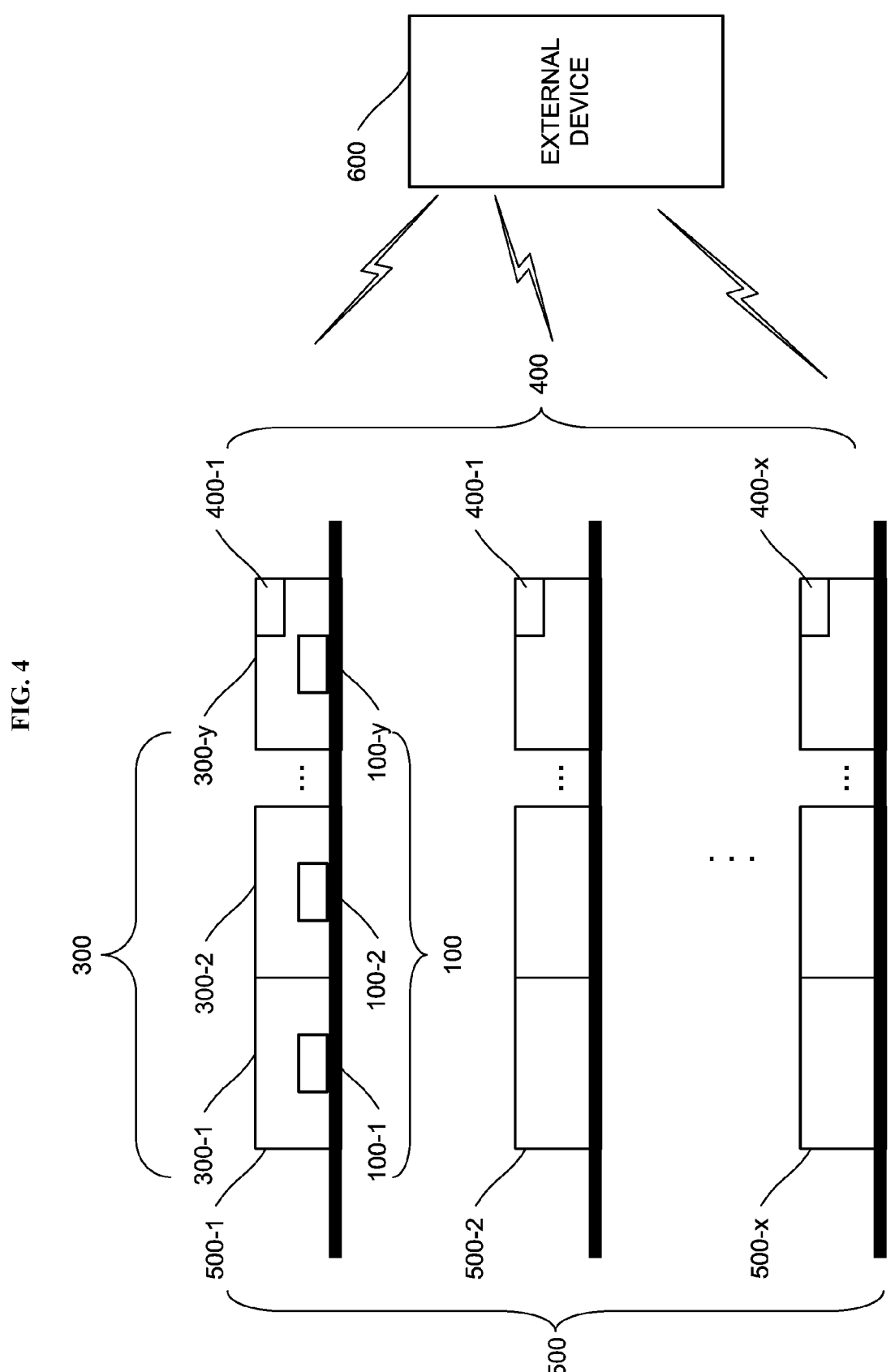
FIG. 4 is a diagram illustrating an example of a system environment in which the data processing device according to the first embodiment is employed.

FIG. 1 is a diagram illustrating an example of the sequence of operations performed by an operation processor of a data processing device for railed vehicle control according to a first embodiment of the technique of the present disclosure. FIG. 2 is a diagram illustrating a schematic configuration of the data processing device according to the first embodiment of the technique of the present disclosure. FIG. 3 is a diagram illustrating an example of a state in which a plurality of electronic devices and the data processing device according to the first embodiment are disposed in a carriage (e.g., passenger car). FIG. 4 is a diagram illustrating an example of a system environment in which the data processing device according to the first embodiment is employed.

With reference to FIG. 2, a description will be first given of a data processing device 100 for railed vehicle control according to the first embodiment of the technique of the present disclosure.

Referring to FIG. 2, the data processing device 100 according to the first embodiment may include a communication interface 110 and an operation processor (computation processor) 130, and a storage 150.

The data processing device 100 may be implemented, for example, using a computing device having data acquisition capabilities, computing capabilities, and communication capabilities.

The communication interface 110 is a communication interface that supports wired/wireless communications. The communication interface 110 may be implemented by a semiconductor device such as a semiconductor chip on communications. For example, the communication interface 110 may receive data in a unicast manner or a multicast manner.

The operation processor 130 may be implemented by a semiconductor device, such as a central processing unit (CPU), a micro controller unit (MCU), an application specific integrated circuit (ASIC), or the like.

The operation processor 130 may be implemented, for example, using a plurality of semiconductor devices.

For example, the operation processor 130 may be implemented using a first semiconductor device performing a control function, a second semiconductor device performing encoding/decoding of data, and a third semiconductor device performing encryption/decryption of data.

The operation processor 130 may control the communication interface 110 and the storage 150 to execute the operations to be described later.

The storage 150 stores data. The storage 150 may be implemented by a semiconductor device such as a semiconductor memory.

Next, with reference to FIG. 3, a description will be given of a state in which a plurality of electronic devices 200 and the data processing device 100 are disposed according to the first embodiment in a carriage.

Referring to FIG. 3, one data processing device 100 and a plurality of electronic devices 200, i.e., a first electronic device 200-1 to an n-th electronic device 200-n, are disposed in a carriage 300 of a railed vehicle 500 that is shown in FIG. 4. Here, "n" is an integer equal to or greater than 2.

In the following description, the first electronic device 200-1 to the n-th electronic device 200-n may also be collectively or individually referred to as the electronic device 200.

The electronic device 200 generates state data and transmits the state data to the data processing device 100. For example, if the electronic device 200-1 serves as a speed sensor, the electronic device 200-1 generates state data indicating the speed of the railed vehicle 500 and transmits the state data to the data processing device 100.

The electronic device 200 may be implemented using, for example, a computing device having data acquisition capabilities, computing capabilities, and communication capabilities. That is, similar to the data processing device 100, the electronic device 200 may be implemented using a computing device including at least a communication interface (not shown), an operation processor (not shown), and a storage (not shown).

Next, with reference to FIG. 4, a description will be given of a system environment in which the data processing device 100 according to the first embodiment is employed.

In FIG. 4, a plurality of railed vehicles 500, i.e., a railed vehicle 500-1 to a railed vehicle 500-x (where x is an integer equal to or greater than 2), are shown. In the following description, the railed vehicle 500-1 to the railed vehicle 500-x may also be referred to collectively or individually as the railed vehicle 500.

One gateway device 400 is disposed in the railed vehicle 500. Specifically, for example, a gateway device 400-1 is disposed in the railed vehicle 500-1, a gateway device 400-2 is disposed in the railed vehicle 500-2, and a gateway device 400-y is disposed in the railed vehicle 500-y (where y is an integer equal to or greater than 2). In the following description, the gateway devices 400-1 to 400-y may also be collectively or individually referred to as the gateway device 400.

The gateway device 400 may be disposed on a locomotive of the railed vehicle 500, for example.

Alternatively, two gateway devices 400 may be disposed in the railed vehicle 500 if two locomotives are disposed in the railed vehicle 500 (i.e., if the locomotives are disposed at a front portion and a rear portion of the railed vehicle 500, respectively). An advantage of having the two gateway devices 400 in the railed vehicle 500 is that if one of the two gateway devices 400 fails or malfunctions, the other gateway device 400 can be utilized.

The railed vehicle 500 includes a plurality of carriages 300. For example, the railed vehicle 500-1 includes a carriage 300-1 to a carriage 300-y (where y is an integer equal to or greater than 2). In the following description, the carriage 300-1 to the carriage 300-y may also be collectively or individually referred to as the carriage 300.

One data processing device 100 is disposed inside the carriage 300. Specifically, a data processing device 100-1 may be disposed in the carriage 300-1, a data processing device 100-2 may be disposed in the carriage 300-2, and a data processing device 100-y may be disposed in the carriage 300-y. In FIG. 4, an example in which the data processing device 100-y is disposed in the carriage 300-y is described. However, the data processing device 100-y may not be disposed in the carriage 300-y. In other words, instead of the data processing device 100-y, the gateway device 400-1 of the railed vehicle 500-1 may be disposed in the carriage 300-*y* to receive state data from the electronic device 200 in the carriage 300-*y*.

As described above, only one single data processing device 100 is disposed inside the carriage 300, thereby reducing the processing load of the data processing device 100 compared to the conventional case.

The electronic device 200 and the data processing device 100 transmit and receive the state data over a wired communication network or a wireless communication network.

The data processing device 100 and the gateway device 400 transmit and receive the carriage data which will be described later over the wired communication network or the wireless communication network.

The state data and vehicle data can also be referred to collectively or individually as "vehicle data."

The gateway device 400 and an external device 600 transmit and receive the vehicle data over the wireless communication network.

The term "external device" is used because the external device 600 is disposed outside the railed vehicle 500. The external device 600 may be, for example, a device operated by an entity such as a control center for controlling the railed vehicle, serving as a server. The external device 600 may also be a device located near the road such as a road side unit (RSU) that receives vehicle data from the railed vehicle 500 (e.g., a train).

Similar to the data processing device 100, each of the gateway device 400 and the external device 600 may be implemented, for example, using a computing device having data acquisition capabilities, computing capabilities, and communication capabilities.

Each of the gateway device 400 and the external device 600 may be implemented using a computing device including at least a communication interface (not shown), an operation processor (not shown), and a storage (not shown).

Hereinafter, the data processing device 100 according to the first embodiment of the technique of the present disclosure will be described in more detail. In particular, the operation (processes) performed by the operation processor 130 of the data processing device 100 will be described in more detail.

Referring to FIG. 1, in step S110, the data processing device 100 (more specifically, the operation processor 130) generates an initial authentication value for carriage by computing first to n-th unique identification information of the first to n-th electronic devices 200-1 to 200-*n* that are disposed in the carriage 300 by using a predetermined hash algorithm that takes as input the first to n-th unique identification information. For example, the operation processor 130 may generate a message that is obtained by sequentially combining the first unique identification information to the n-th unique identification information, and generate an initial authentication value for carriage by computing the generated message by using a predetermined hash algorithm that takes as input the generated message.

The initial authentication value for carriage is used to authenticate carriage data as will be described later. That is, the initial authentication value for carriage may be used to verify whether or not the electronic device 200 disposed in the carriage 300 is changed to an arbitrary malicious electronic device.

In step S110, the operation processor 130 may receive the first unique identification information to the n-th unique identification information from the first electronic device 200-1 to the n-th electronic device 200-*n*, respectively.

Alternatively, in step S110, the operation processor 130 may receive each of the first unique identification information to the n-th unique identification information from the external device 600. That is, the external device 600 may store, in advance, the first to n-th unique identification information of the first to n-th electronic devices 200-1 to 200-*n* that are disposed in the carriage 300. Then, the external device 600 transmits each of the first unique identification information to the n-th unique identification information to the data processing device 100 upon the request of the data processing device 100.

Step S110 may preferably be performed prior to the operation of the railed vehicle 500. Alternatively, step S110 may be performed when each of the first electronic device 200-1 to the n-th electronic device 200-*n* is mounted and powered on in the carriage 300. Thereby, the operation processor 130 can check the electronic device 200 disposed in the carriage 300 before operating the railed vehicle 600 to verify whether or not the electronic device 200 disposed in the carriage 300 is changed to an arbitrary malicious electronic device, as will be described later.

Next, in step S120, the data processing device 100 (more specifically, the operation processor 130) transmits an encryption key and a hash key to the first electronic device 200-1 to the n-th electronic device 200-*n*. For example, the data processing device 100 may transmit the encryption key and the hash key in a multicast manner.

The encryption key and the hash key are used by the first electronic device 200-1 to the n-th electronic device 200-*n* to encrypt and authenticate the state data.

The encryption key and the hash key may be shared between the data processing device 100 and the electronic device 200 (i.e., the first electronic device 200-1 to the n-th electronic device 200-*n*). However, the first embodiment is not limited to thereto.

For example, the first embodiment may be applicable when the data processing device 100 and the first electronic device 200-1 share a first encryption key and a first hash key, the data processing device 100 and the second electronic device 200-2 share a second encryption key and a second hash key, and similarly, the data processing device 100 and the n-th electronic device 200-*n* share a n-th encryption key and a n-th hash key.

In step S120, the operation processor 130 may receive the encryption key and the hash key from the gateway device 400 disposed in the railed vehicle 500.

The encryption key and the hash key may be generated by the gateway device 400 using the unique identification information of the railed vehicle 500 and the multicast key received from the external device 600.

More specifically, the external device 600 transmits the multicast key to the railed vehicle 500 (more specifically, the railed vehicle 500-1 to the railed vehicle 500-*x*) in the multicast manner.

The gateway device 400-1 of the railed vehicle 500-1 utilizes the multicast key and the unique identification information of the railed vehicle 500-1 to generate an encryption key and a hash key that are applied within the railed vehicle 500-1. The gateway device 400-1 may generate the encryption key and the hash key by using a predetermined key generation algorithm that takes as input the multicast key and the unique identification information of the railed vehicle 500-1.

Similarly, the gateway device 400-2 of the railed vehicle 500-2 generates an encryption key and a hash key that are applied within the railed vehicle 500-2, and the gateway device 400-*x* of the railed vehicle 500-*x* generates an encryption key and a hash key that are applied within the railed vehicle 500-*x*. Accordingly, the encryption keys and the hash keys used in the railed vehicles 500-1 to 500-*x* are different from one another.

Preferably, step S120 is performed at predetermined intervals or in response to predetermined events. The predetermined intervals may include, for example, one day or one week. The predetermined events may include, for example, a case of changing an encryption key and a hash key of the railed vehicle 500 for security reasons. For example, at least one of the gateway device 400 and the external device 600 may generate an event for changing the encryption key and the hash key. In response to the event, the external device 600 generates a multicast key and transmits the generated multicast key to the gateway device 400, and the gateway device 400 generates a new encryption key and a new hash key and transmits them to the data processing device 100. The data processing device 100 transmits the new encryption key and the new hash key to the first electronic device 200-1 to the n-th electronic device 200-*n* disposed inside the carriage 300 through step S120. Thus, in the communication process from the electronic device 200 to the external device 600, the integrity and security of data can be further enhanced.

For example, in the case that the data processing device 100 and the first electronic device 200-1 share the first encryption key and the first hash key, and similarly, the data processing device 100 and the n-th electronic device 200-*n* share the n-th encryption key and the n-th hash key, the gateway device 400 of the railed vehicle 500 generates the first encryption key and the first hash key using the multicast key, the unique identification information of the railed vehicle 500, and the first unique identification information of the first electronic device 200-1, and similarly, the gateway device 400 of the railed vehicle 500 generates the n-th encryption key and the n-th hash key using the multicast key, the unique identification information of the railed vehicle 500, and the n-th unique identification information of the n-th electronic device 200-*n*.

Next, in step S130, the data processing device 100 (more specifically, the operation processor 130) receives, from an i-th electronic device among the first electronic device 200-1 to the n-th electronic device 200-*n*, i-th state data including i-th state information and an i-th device authentication value, and authenticates the i-th state data. Here, "i" is an integer from 1 to n.

At least a portion of the i-th state information may be encrypted using a stream cipher method. As an example of the stream encryption method, an encryption method such as RC4, A5/1, or A5/2 may be used. Therefore, each of the i-th electronic device and the data processing device 100 receives and transmits the i-th state information that is encrypted to an appropriate level using the stream encryption method, so that the state data can be transmitted and received quickly therebetween while minimizing the processing load and maintaining the security. Further, the integrity of data can be verified by authenticating the i-th state data.

In step S130, the operation processor 130 generates an authentication value for device by computing at least a portion of the i-th state information by using the hash key and a predetermined first message authentication code (MAC) generation algorithm that takes as input at least the portion of the i-th state information, and authenticate the i-th state data by comparing the generated authentication value for device with an i-th device authentication value included in the i-th state data.

For example, the i-th electronic device generates an i-th device authentication value by computing at least a portion of i-th state information by using the hash key and a predetermined first MAC generation algorithm that takes as input at least the portion of i-th state information. Thereafter, the i-th electronic device transmits i-th state data including the i-th state information and the i-th device authentication value to the data processing device 100. The operation processor 130 compares an authentication value for device with the i-th device authentication value, and authenticates the i-th state data if it is determined that the authentication value for device is the same as the i-th device authentication value.

Alternatively, the i-th electronic device generates an i-th device authentication value by computing at least a portion of i-th state information by using the hash key and a predetermined third MAC generation algorithm that takes as input at least the portion of i-th state information. The operation processor 130 compares the authentication value for device with the i-th device authentication value, and authenticates i-th state data if it is determined that the authentication value for device corresponds to the i-th device authentication value. The term "the authentication value for device corresponds to the i-th device authentication value" means that a specific relationship is established between the i-th device authentication value and the authentication value for device, the i-th device authentication value being generated using the third MAC generation algorithm and included in the i-th state data and the authentication value for device being generated by the operation processor 130.

In step S130, after the i-th state data is authenticated, the operation processor 130 may decrypt at least a portion of the i-th state information using an encryption key to verify the i-th state data. For example, at least a portion of the i-th state information may be decrypted using the stream encryption method.

A more specific example of step S130 will be described later.

Next, in step S140, the data processing device 100 (more specifically, the operation processor 130) generates carriage data using first state data to n-th state data authenticated through step S130.

The carriage data is data indicating an internal state of the carriage 300 that is generated using the first electronic device 200-1 to the n-th electronic device 200-*n*. For example, the carriage data may be generated by combining the first state data to the n-th state data. The carriage data may include various information inside the carriage 300 such as temperature information, fire detection information, reversing gear information, door state information, and emergency handle state information. At least some of the first state data to the n-th state data and the carriage data may have a format according to, for example, a TCMS protocol.

Next, in step S150, the data processing device 100 (more specifically, the operation processor 130) generates a carriage authentication value based on first device identification information to n-th device identification information obtained from the first state data to the n-th state data. Then, the data processing device 100 authenticates the carriage data by comparing the carriage authentication value with the initial authentication value for carriage.

The first state data may include, for example, the first device identification information of the first electronic device 200-1, and the n-th state data may include, for example, the n-th device identification information of the n-th electronic device 200-*n*.

The first device identification information is preferably the same as the aforementioned first unique identification information, and the n-th device identification information is preferably the same as the aforementioned n-th unique identification information. In that case, in step S150, the operation processor 130 generates the carriage authentication value by computing the first device identification information to the n-th device identification information by using the same hash algorithm as in step S110 that takes as input the first device identification information to the n-th device identification information. For example, the operation processor 130 may generate a message that is obtained by sequentially combining the first device identification information to the n-th device identification information, and generates the initial authentication value for carriage by computing the generated message by using the same hash algorithm as in step S110 that takes as input the generated message.

Then, the operation processor 130 authenticates the carriage data if the carriage authentication value is the same as the initial authentication value for carriage.

As another example, the first device identification information may be different from the aforementioned first unique identification information, and the n-th device identification information may be different from the aforementioned n-th unique identification information.

In this case, one-to-one correspondence relationships between the first to n-th device identification information and the first to n-th unique identification information (that is, the correspondence relationship between the first device identification information and the first unique identification information, between the second device identification information and the second unique identification information, . . . , between the n-th device identification information and the n-th unique identification information) may be stored in advance in the storage 150. In step S150, the operation processor 130 obtains the first unique identification information to the n-th unique identification information based on the correspondence relationship stored in the storage 150, and generates the carriage authentication value by using the same hash algorithm as in step S110 that takes as input the first unique identification information to the n-th unique identification information. Then, the operation processor 130 authenticates the carriage data if the carriage authentication value is the same as the initial authentication value for carriage.

If the carriage authentication value and the initial authentication value for carriage are not the same in step S150, it may be determined that some of the electronic devices 200 disposed inside the carriage 300 have been altered. Therefore, if the carriage authentication value generated in step S150 is not the same as the initial authentication value for carriage, preferably, the carriage data is not authenticated. However, in the case when a signal is received, for example, from the external device 600, indicating that the changed state of some of the electronic devices 200 disposed inside the carriage 300 is appropriate, the carriage data may be authenticated.

Meanwhile, similar to the case of comparing the authentication value for device with the i-th device authentication value described above, in step S150, the operation processor 130 may authenticate the carriage data when the carriage authentication value and the initial authentication value for carriage correspond to each other.

Referring back to FIG. 1, in step S160, the data processing device 100 (more specifically, the operation processor 130) may transmit the carriage data, which is generated through step S140 and authenticated through step S150, to the gateway device 400 disposed in the railed vehicle 500.

When the carriage data is received, the gateway device 400 may transmit the carriage data to the external device 600. The gateway device 400 may receive, for example, carriage data from each of the plurality of carriages 300 and transmit the carriage data to the external device 600.

The gateway device 400 and the external device 600 may also store the encryption key, the hash key, the first to n-th unique identification information, the hash algorithm, and the first MAC generation algorithm described above.

Accordingly, the gateway device 400 and the external device 600 may also verify the integrity and security of the vehicle data (i.e., the state data and the carriage data) in the same manner as in steps S130 to S150 described above.

Therefore, in the communication process from the electronic device 200 to the external device 600, each of the configurations (i.e., the data processing device 100, the gateway device 400, and the external device 600) may verify the integrity and security of the vehicle data (i.e., the state data and the carriage data).

As described above, according to the first embodiment of the technique of the present disclosure, it is possible to provide the data processing device that is capable of verifying and ensuring the integrity of vehicle data while transmitting and receiving the vehicle data; communicating the vehicle data in real time by encrypting or decrypting the vehicle data to an appropriate level in real time or quasi-real time even when the data processing device is equipped with semiconductor devices having low computing power (computing capabilities); and reducing the processing load since the data processing device is disposed in each carriage and receives state data from the plurality of electronic devices disposed in each carriage.

Second Embodiment

Figure 6:
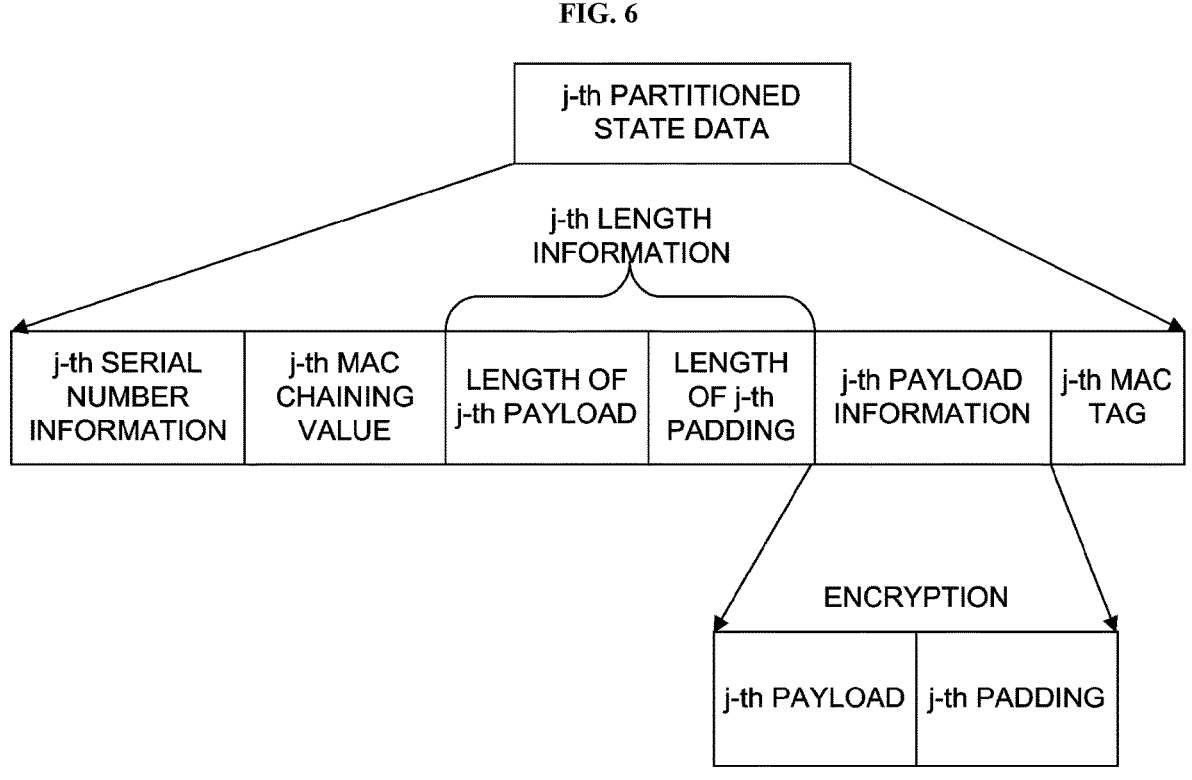
FIG. 6 is a diagram illustrating an example of a structure of a j-th partitioned state data of i-th state data in the data processing device for railed vehicle control according to the second embodiment of the technique of the present disclosure.

FIG. 5 is a diagram illustrating an example of the sequence of operations performed by an operation processor of a data processing device for railed vehicle control according to a second embodiment of the technique of the present disclosure, and FIG. 6 is a diagram illustrating an example of a structure of a j-th partitioned state data of i-th state data in the data processing device for railed vehicle control according to the second embodiment of the technique of the present disclosure.

In the second embodiment of the technique of the present disclosure, which is described with reference to FIGS. 5 and 6, a case in which the i-th state data includes first partitioned state data to m-th partitioned state data (where "m" is an integer equal to or greater than 2) will be described. That is, the i-th state data transmitted from the i-th electronic device is divided (partitioned) into a plurality of state data, and the data processing device 100 receives the plurality of partitioned state data (i.e., first partitioned state data to m-th partitioned state data). Thus, in the second embodiment of the technique of the present disclosure, the i-th state data includes the first partitioned state data to the m-th partitioned state data, and an i-th device authentication value includes a first MAC tag to a m-th MAC tag.

Accordingly, in FIG. 5, step S130 of the first embodiment is illustrated in more detail.

Referring to FIG. 6, the j-th partitioned state data among the first partitioned state data to the m-th partitioned state data includes at least j-th serial number information, a j-th MAC chaining value, j-th payload information, and a j-th MAC tag. Here, "j" is an integer from 1 to m.

The j-th partitioned state data may further include j-th length information.

It will be apparent to those skilled in the art that the structure of the j-th partitioned state data illustrated in FIG. 6 is merely an example, and may be modified in various ways.

The j-th serial number information is information indicating the order of the j-th partitioned state data. For example, the serial number of the first partitioned state data (i.e., first serial number information) may be designated as "1," the serial number of the second partitioned state data (i.e., second serial number information) may be designated as "2," and the serial number of the m-th partitioned state data (i.e., m-th serial number information) may be designated as "m."

The j-th MAC chaining value serves as information for authenticating the order of the j-th partitioned state data.

The j-th length information (more specifically, a length of a j-th payload and a length of a j-th padding) is information including the length of the j-th payload and the length of the j-th padding corresponding to the j-th payload information in the j-th partitioned state data.

The j-th payload information includes the j-th payload and the j-th padding. The j-th payload information may include the j-th payload only. The j-th payload information may be encrypted using the encryption key described above. For example, the j-th payload information may be encrypted using the stream cipher method.

The j-th MAC tag serves as information for authenticating the integrity of the j-th partitioned state data.

Referring to FIG. 5, in step S133, the data processing device 100 (more specifically, the operation processor 130) generates an authentication value by computing at least the j-th MAC chaining value and the j-th payload information by using the hash key and the first MAC generation algorithm that takes as input at least the j-th MAC chaining value and the j-th payload information, and authenticates the j-th partitioned state data by comparing the j-th MAC tag with the generated authentication value.

In the case where the j-th partitioned state data further includes the j-th length information, it is preferable that the authentication value may be generated by computing the j-th MAC chaining value, the j-th length information, and the j-th payload information by using the hash key and the first MAC generation algorithm that takes as input the j-th MAC chaining value, the j-th length information, and the j-th payload information.

More specifically, the operation processor 130 extracts the j-th serial number information, the j-th MAC chaining value, the j-th payload information, and the j-th MAC tag (and the j-th length information) from the j-th partitioned state data received in step S130, and then generates the authentication value. Thereafter, the j-th MAC tag is compared with the authentication value.

As described above, the j-th serial number information indicates the order of the j-th partitioned state data.

If "j" is equal to 1, the j-th MAC chaining value is a predetermined initial value. If "j" is not equal to 1, the j-th MAC chaining value is generated based on the (j−1)-th MAC chaining value.

For example, if "j" is equal to 1, the j-th MAC chaining value may be generated by computing the j-th MAC chaining value, the j-th length information, and the j-th payload information by using the hash key and the first MAC generation algorithm that takes as input the i-th unique identification information, and if "j" is not equal to 1, the j-th MAC chaining value may be generated by computing the (j−1)-th MAC chaining value by using the hash key and the first MAC generation algorithm that takes as input the (j−1)-th MAC chaining value.

Alternatively, if "j" is not equal to 1, the (j−1)-th MAC tag may be used for the j-th MAC chaining value.

The j-th MAC chaining value generated as described above is included in advance in the j-th partitioned state data.

The j-th MAC tag may be generated by computing at least the j-th MAC chaining value and the j-th payload information by using the hash key and the first MAC generation algorithm that takes as input at least the j-th MAC chaining value and the j-th payload information.

In the case where the j-th partitioned state data further includes the j-th length information, it is preferable that the j-th MAC tag may be generated by computing the j-th MAC chaining value, the j-th length information, and the j-th payload information by using the hash key and the first MAC generation algorithm that takes as input the j-th MAC chaining value, the j-th length information, and the j-th payload information.

The j-th MAC tag generated as described above is included in advance in the j-th partitioned state data.

Accordingly, the operation processor 130 may authenticate the integrity of the j-th partitioned state data by comparing the j-th MAC tag included in the j-th partitioned state data with the authentication value generated as described above.

In addition, by using the j-th MAC chaining value, the integrity and the order of the first to m-th partitioned state data can be authenticated. That is, if "j" is not equal to 1, the (j−1)-th MAC chaining value of the (j−1)-th partitioned state data, which is the data immediately preceding the j-th partitioned state data in order, is used to generate the j-th MAC chaining value, so that the integrity and the order of the j-th partitioned state data can be authenticated.

Referring back to FIG. 5, in step S135, the data processing device 100 (more specifically, the operation processor 130) may decrypt the j-th payload information using the encryption key and the stream encryption method when the j-th partitioned state data is authenticated through step S133.

In other words, if necessary, the data processing device 100 may verify the j-th payload information through the decryption.

As described above, according to the second embodiment of the technique of the present disclosure, in addition to the effects described with reference to the first embodiment, it is possible to verify the integrity of the state data even when the electronic device 200 transmits the state data in segments (that is, the electronic device 200 divides the state data into the plurality of partitioned state data and transmits the plurality of partitioned state data) and the data processing device 100 receives the state data transmitted in segments (the plurality of the partitioned state data).

Third Embodiment

Figure 8:
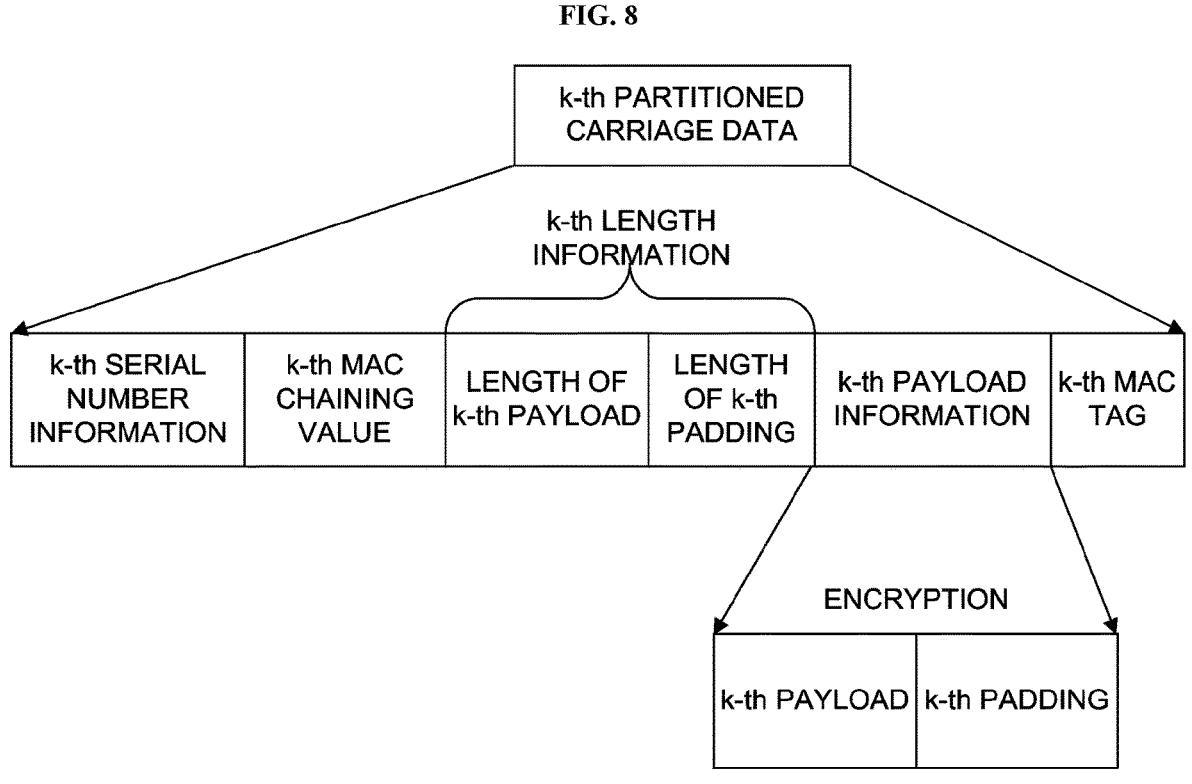
FIG. 8 is a diagram illustrating an example of a structure of a k-th partitioned state data in the data processing device for railed vehicle control according to the third embodiment of the technique of the present disclosure.

FIG. 7 is a diagram illustrating an example of the sequence of operations performed by an operation processor of a data processing device for railed vehicle control according to a third embodiment of the technique of the present disclosure, and FIG. 8 is a diagram illustrating an example of a structure of a k-th partitioned state data in the data processing device for railed vehicle control according to the third embodiment of the technique of the present disclosure.

In the third embodiment of the technique of the present disclosure, which is described with reference to FIGS. 7 and

8, a case in which the carriage data includes first partitioned carriage data to p-th partitioned carriage data (where "p" is an integer equal to or greater than 2) will be described. That is, the data processing device 100 converts the carriage data into the first partitioned carriage data to the p-th partitioned carriage data in step S160 and transmits the first partitioned carriage data to the p-th partitioned carriage data to the gateway device 400.

Accordingly, in FIG. 7, step S160 of the first embodiment is illustrated in more detail.

Referring to FIG. 8, the k-th partitioned carriage data among the first partitioned carriage data to the p-th partitioned carriage data includes at least k-th serial number information, a k-th MAC chaining value, k-th payload information, and a k-th MAC tag. Here, "k" is an integer from 1 to p.

The k-th partitioned carriage data may further include k-th length information.

It will be apparent to those skilled in the art that the structure of the k-th partitioned carriage data illustrated in FIG. 8 is merely an example, and may be modified in various ways.

The k-th serial number information is information indicating the order of the k-th partitioned carriage data. For example, the serial number of the first partitioned carriage data (i.e., first serial number information) may be designated as "1," the serial number of the second partitioned carriage data (i.e., second serial number information) may be designated as "2," and the serial number of the p-th partitioned carriage data (i.e., p-th serial number information) may be designated as "p."

The k-th MAC chaining value serves as information for authenticating the order of the k-th partitioned carriage data.

The k-th length information (more specifically, a length of the k-th payload and a length of the k-th padding) is information including the length of the k-th payload and the length of the k-th padding corresponding to the k-th payload information in the k-th partitioned carriage data.

The k-th payload information includes the k-th payload and the k-th padding. The k-th payload information may include the k-th payload only. The k-th payload information may be encrypted using the encryption key described above. For example, the k-th payload information may be encrypted using the stream cipher method.

If "k" is equal to 1, the k-th MAC chaining value is a predetermined initial value. If "k" is not equal to 1, the k-th MAC chaining value is generated based on the (k−1)-th MAC chaining value.

For example, the first MAC chaining value (e.g., the predetermined initial value) may be generated by computing the initial authentication value for carriage described above by using the hash key and a predetermined second MAC generation algorithm that takes as input the initial authentication value for carriage. If "k" is not equal to 1, the k-th MAC chaining value may be generated by computing the (k−1)-th MAC chaining value by using the hash key and the second MAC generation algorithm that takes as input the (k−1)-th MAC chaining value.

The second MAC generation algorithm may be the same as the first MAC generation algorithm described above, but is preferably that the second MAC generation algorithm is different from the first MAC generation algorithm for security purposes.

If "k" is not equal to 1, the (k−1)-th MAC tag is used for the k-th MAC chaining value.

The k-th MAC tag serves as information for authenticating the integrity of the k-th partitioned carriage data.

The k-th MAC tag may be generated by computing at least the k-th MAC chaining value and the k-th payload information by using the hash key and the second MAC generation algorithm that takes as input at least the k-th MAC chaining value and the k-th payload information.

By using the k-th MAC chaining value and the k-th MAG tag, the integrity and the order of the first to p-th partitioned carriage data can be authenticated. That is, if "k" is not equal to 1, the (k−1)-th MAC chaining value of the (k−1)-th partitioned carriage data, which is the data immediately preceding the k-th partitioned carriage data in order, is used to generate the k-th MAC chaining value, so that the integrity and the order of the k-th partitioned state data can be authenticated.

Referring back to FIG. 7, in step S163, the data processing device 100 (more specifically, the operation processor 130) converts the carriage data into the first partitioned carriage data to the p-th partitioned carriage data using the encryption key and the hash key.

Next, in step S166, the data processing device 100 (more specifically, the operation processor 130) transmits the first partitioned carriage data to the p-th partitioned carriage data transformed through step S163 to the gateway device 400.

Therefore, when the gateway device 400 receives the first partitioned carriage data to the p-th partitioned carriage data, the integrity and the order of the first partitioned carriage data to the p-th partitioned carriage data can be authenticated by comparing the k-th MAC tag included in the k-th partitioned carriage data described above with a value generated by computing at least the k-th MAC chaining value and the k-th payload information by using the hash key and the predetermined second MAC generation algorithm that takes as input at least the k-th MAC chaining value and the k-th payload information.

As described above, according to the third embodiment of the technique of the present disclosure, in addition to the effects described with reference to the first embodiment, it is possible to verify the integrity of the carriage data even when the data processing device 100 transmits the carriage data in segments (that is, the data processing device 100 divides the carriage data into the plurality of partitioned carriage data and transmits the plurality of partitioned carriage data) and the gateway device 400 receives the carriage data transmitted in segments (the plurality of partitioned carriage data).

OTHER EMBODIMENTS

While the technique of the present disclosure is described in detail by way of the embodiments described above, the technique of the present disclosure is not limited thereto and may be modified in various ways without departing from the scope thereof.

Further, the technique of the present disclosure has been described based on an example of computing a MAC tag after payload information is encrypted. However, the technique of the present disclosure is not limited thereto. The technique of the present disclosure may also be employed where the payload information is encrypted after the MAC tag is computed, for example.

For example, the technique of the present disclosure may be applied to a method for communicating data, which is performed by a data processing device disposed in a carriage of a railed vehicle. The method includes: (a) generating an initial authentication value for carriage by computing first unique identification information to n-th unique identification information of first electronic device to n-th electronic device that are disposed in the carriage by using a predetermined hash algorithm that takes as input the first unique identification information to the n-th unique identification information, where "n" is an integer equal to or greater than 2; (b) transmitting an encryption key and a hash key to the first electronic device to the n-th electronic device; (c) receiving, from an i-th electronic device among the first electronic device to the n-th electronic device, i-th state data including i-th state information and an i-th device authentication value, and authenticating the i-th state data where "i" is an integer from 1 to n; (d) generating carriage data using first state data to n-th state data authenticated in (c); and (e) generating a carriage authentication value based on first device identification information to n-th device identification information obtained from the first state data to the n-th state data, and authenticating the carriage data by comparing the carriage authentication value with the initial authentication value for carriage. Further, in the i-th state information is encrypted by the encryption key and, (c) includes (c–1) generating an authentication value for device by computing a portion of the i-th state information by using the hash key and a predetermined first message authentication code (MAC) generation algorithm that takes as input at least the portion of the i-th state information, and the i-th state data is authenticated by comparing the generated authentication value for device with the i-th device authentication value included in the i-th state data.

Other technical features of the technique of the present disclosure may also be applied in a similar way to the method for communicating data described above.

Accordingly, the exemplary embodiments disclosed herein are not used to limit the technical idea of the present disclosure, but to explain the present disclosure, and the scope of the technical idea of the present disclosure is not limited by those embodiments. Therefore, the scope of protection of the present disclosure should be construed as defined in the following claims, and all technical ideas that fall within the technical idea of the present disclosure are intended to be embraced by the scope of the claims of the present disclosure.

INDUSTRIAL APPLICABILITY

According to the embodiments of the technique of the present disclosure, it is possible to provide the data processing device that is capable of verifying and ensuring the integrity of vehicle data while transmitting and receiving the vehicle data; communicating the vehicle data in real time by encrypting or decrypting the vehicle data to an appropriate level in real time or quasi-real time even when the data processing device is equipped with semiconductor devices having low computing power (computing capabilities); and reducing the processing load since the data processing device is disposed in each carriage and receives state data from the plurality of electronic devices disposed in each carriage.

What is claimed is:

1. A data processing device disposed in a carriage of a railed vehicle, the data processing device comprising:
an operation processor configured to perform:
(a) generating an initial authentication value for the carriage by computing first unique identification information of a first electronic device to an n-th electronic device that are disposed in the carriage by using a predetermined hash algorithm that takes as input the first unique identification information to the n-th unique identification information, wherein "n" is an integer equal to or greater than 2;
(b) transmitting an encryption key and a hash key to the first electronic device to the n-th electronic device;
(c) receiving, from the first electronic device to the n-th electronic device, first state data including first state information and a first device authentication value to n-th state data including n-th state information and an n-th device authentication value, and authenticating the first state data to the n-th state data;
(d) generating carriage data using the first state data to the n-th state data authenticated in (c); and
(e) generating a carriage authentication value based on first device identification information to n-th device identification information obtained from the first state data to the n-th state data, and authenticating the carriage data by comparing the carriage authentication value with the initial authentication value for the carriage,
wherein i-th state data including i-th state information and an i-th device authentication value is received from an i-th electronic device among the first electronic device to the n-th electronic device, and is encrypted by the encryption key and,
wherein, in (c), an authentication value is generated by computing at least a portion of the i-th state information by using the hash key and a predetermined first message authentication code (MAC) generation algorithm that takes as input at least the portion of the i-th state information, and the i-th state data is authenticated by comparing the generated authentication value with the i-th device authentication value included in the i-th state data.

2. The data processing device of claim 1, wherein
the first unique identification information to the n-th unique identification information are received from the first electronic device to the n-th electronic device, respectively, or are received from a predetermined external device.

3. The data processing device of claim 1, wherein (a) is performed prior to putting the railed vehicle into service, or (a) is performed when each of the first electronic device to the n-th electronic device is mounted and powered on in the carriage.

4. The data processing device of claim 1, wherein the encryption key and the hash key are received from a gateway device disposed in the railed vehicle.

5. The data processing device of claim 4, wherein the encryption key and the hash key are generated by the gateway device using unique identification information of the railed vehicle and a multicast key received from a predetermined external device.

6. The data processing device of claim 1, wherein at least the portion of the i-th state information is encrypted using a stream cipher method.

7. The data processing device of claim 1, wherein the carriage data has a format according to a train control and monitoring system (TCMS) protocol.

8. The data processing device of claim 1, wherein the i-th state data includes first partitioned state data to m-th partitioned state data wherein "m" is an integer equal to or greater than 2,
the i-th device authentication value includes a first MAC tag to a m-th MAC tag,
j-th partitioned state data among the first partitioned state data to the m-th partitioned state data includes at least j-th serial number information, a j-th MAC chaining value, j-th payload information, and a j-th MAC tag wherein "j" is an integer from 1 to m, and wherein, in (c), another authentication value is generated by computing at least the j-th MAC chaining value and the j-th payload information by using the hash key and the predetermined first MAC generation algorithm that takes as input at least the j-th MAC chaining value and the j-th payload information, and the j-th partitioned state data is authenticated by comparing the j-th MAC tag with the other authentication value.

9. The data processing device of claim 8, wherein if "j" is equal to 1, the j-th MAC chaining value is a predetermined initial value, and if "j" is not equal to 1, the j-th MAC chaining value is generated based on (j−1)-th MAC chaining value.

10. The data processing device of claim 8, wherein if "j" is equal to 1, the j-th MAC chaining value is generated by computing i-th unique identification information by using the hash key and the predetermined first MAC generation algorithm that takes as input the i-th unique identification information, and if "j" is not equal to 1, the j-th MAC chaining value is generated by computing the (j−1)-th MAC chaining value by using the hash key and the predetermined first MAC generation algorithm that takes as input the (j−1)-th MAC chaining value.

11. The data processing device of claim 8, wherein if "j" is not equal to 1, a (j−1)-th MAC tag is used for the j-th MAC chaining value.

12. The data processing device of claim 8, wherein, in (c), the j-th payload information is decrypted using the encryption key and a stream encryption method when the j-th partitioned state data is authenticated.

13. The data processing device of claim 8, wherein the j-th payload information includes a j-th payload and a j-th padding that are in encrypted form, the j-th partitioned state data further includes j-th length information that includes a length of the j-th payload and a length of the j-th padding, and the authentication value is generated by computing at least the j-th MAC chaining value, the j-th length information, and the j-th payload information by using the hash key and the predetermined first MAC generation algorithm that takes as input at least the j-th MAC chaining value, the j-th length information, and the j-th payload information.

14. The data processing device of claim 1, wherein the carriage authentication value is generated by computing the first device identification information to the n-th device identification information by using the predetermined hash algorithm that takes as input the first device identification information to the n-th device identification information, and wherein, in (e), the carriage data is authenticated if the carriage authentication value is the same as the initial authentication value for the carriage.

15. The data processing device of claim 1, wherein the operation processor is further configured to perform:

(f) transmitting the carriage data that is generated in (d) and authenticated in (e) to a gateway device disposed in the railed vehicle.

16. The data processing device of claim 15, wherein, in (f), the carriage data is transformed into first partitioned carriage data to p-th partitioned carriage data using the encryption key and the hash key wherein "p" is an integer equal to or greater than 2, and the first partitioned carriage data to the p-th partitioned carriage data are transmitted to the gateway device, wherein k-th partitioned carriage data among the first partitioned carriage data to the p-th partitioned carriage data includes at least k-th serial number information, a k-th MAC chaining value, k-th payload information, and a k-th MAC tag wherein "k" is an integer from 1 to p, if "k" is equal to 1, the k-th MAC chaining value is a predetermined initial value, and if "k" is not equal to 1, the k-th MAC chaining value is generated based on (k−1)-th MAC chaining value, the k-th MAC tag is generated by computing at least the k-th MAC chaining value and the k-th payload information by using the hash key and a predetermined second MAC generation algorithm that takes as input at least the k-th MAC chaining value and the k-th payload information, and the k-th payload information is encrypted using the encryption key.

17. The data processing device of claim 16, wherein the k-th payload information is encrypted using a stream cipher method.

18. The data processing device of claim 16, wherein the predetermined initial value is generated by computing the initial authentication value for the carriage by using the hash key and the predetermined second MAC generation algorithm that takes as input the initial authentication value, and if "k" is not equal to 1, the k-th MAC chaining value is generated by computing the (k−1)-th MAC chaining value by using the hash key and the predetermined second MAC generation algorithm that takes as input the (k−1)-th MAC chaining value.

19. The data processing device of claim 16, wherein if "k" is not equal to 1, (k−1)-th MAC tag is used for the k-th MAC chaining value.

20. The data processing device of claim 16, wherein the k-th payload information includes a k-th payload and a k-th padding that are in encrypted form, the k-th partitioned carriage data further includes k-th length information that includes a length of the k-th payload and a length of the k-th padding, and the k-th MAC tag is generated by computing the k-th MAC chaining value, the k-th length information, and the k-th payload information by using the hash key and the predetermined second MAC generation algorithm that takes as input the k-th MAC chaining value, the k-th length information, and the k-th payload information.

* * * * *